United States Patent [19]

Jones et al.

[11] Patent Number: 4,770,049

[45] Date of Patent: Sep. 13, 1988

[54] LOAD MEASURING DEVICES

[75] Inventors: Gerald M. Jones, Trimpley; Dennis H. Sansome, Little Aston, both of England

[73] Assignee: National Research Development Corporation, London, England

[21] Appl. No.: 30,507

[22] Filed: Mar. 26, 1987

[30] Foreign Application Priority Data

Mar. 26, 1986 [GB] United Kingdom ................. 8607518

[51] Int. Cl.$^4$ .............................................. G07L 1/22
[52] U.S. Cl. ...................................... 73/862.65; 338/5
[58] Field of Search ............... 73/862.65, 862.66, 761, 73/862.63, 862.67; 338/5

[56] References Cited

U.S. PATENT DOCUMENTS

| Re. 31,698 | 10/1984 | Sansome et al. | |
|---|---|---|---|
| 2,493,029 | 1/1950 | Ramberg | 73/862.65 X |
| 3,036,283 | 5/1962 | Singdale et al. | 338/5 |
| 3,088,083 | 4/1963 | Ward | 73/862.67 X |
| 3,199,057 | 8/1965 | Gindes et al. | 73/862.65 X |
| 3,535,923 | 10/1965 | Martorana et al. | 73/862.65 X |
| 4,398,429 | 8/1983 | Cook et al. | 73/862.65 X |

FOREIGN PATENT DOCUMENTS

| 1050571 | 2/1959 | Fed. Rep. of Germany ... 73/862.65 |
| 986973 | 3/1965 | United Kingdom ..................... 338/5 |
| 2126357 | 3/1984 | United Kingdom . |
| 2147426 | 5/1985 | United Kingdom . |
| 266291 | 1/1971 | U.S.S.R. .......................... 73/862.65 |

Primary Examiner—Charles A. Ruehl
Attorney, Agent, or Firm—Cushman, Darby & Cushman

[57] ABSTRACT

A ring-shaped device for interposing between two bodies, to measure the force tending to urge them together or pull them apart in a direction coaxial with the ring. Both axial ends of the ring are robust and resist distortion, but between its ends the ring is of convoluted section so that when the ring shortens or lengthens axially under the applied load, hoop stresses are set up in the convoluted part. These stresses are detected by strain gauges located at intervals around the circumference of that part of the ring. The ring may be contained within a protective cylindrical casing, so designed as not to prevent the full magnitude of the applied load being communicated to the ring inside. To improve linearity of the correlation between the applied load and the response of the strain gauges, a stiffening ring may be attached coaxially to the ring; this sleeve may have robust axial ends, and a thinner cylindrical center part registering with the convoluted part of the ring.

11 Claims, 3 Drawing Sheets

LOAD MEASURING DEVICES

This invention relates to ring-shaped load-measuring devices, for use for example in measuring the loads set up in engineering equipment such as rolling mills and draw-benches. A ring for such purposes is normally mounted as an element between the rolls or drawing jaws and the housing of the apparatus, with the ring axis coincident with the axis of the load which is to be measured. The ring is elastically distorted by the load, strain gauges bonded to the body of the ring respond to that deformation, and the response of the gauges is processed to give a signal indicative of load.

A well-tried ring-shaped load cell, frequently encountered in the laboratory or industrial apparatus, comprises a hollow torus, mounted coaxially with the load so that application of the latter causes the cross-section of the torus to change from circular to approximately elliptical, with the minor axis of that ellipse parallel to the common axis of the cell and of the load. Another ring-shaped cell, the subject of published U.K. Patent Application GB No. 2147426A, comprises a ring the shape of which, when viewed in radial section, is a solid body symmetrical about its length and arranged with that length inclined to the common axis of load and ring. One axial end of the ring is therefore smaller in radius than the other, and an applied compressive load tends to distort the ring by putting the end of smaller radius into hoop compression, and the opposite end of larger radius into hoop tension.

Useful results have been obtained from rings of both the types just described, and the clear separation in the second ring of the regions of hoop tension and hoop compression has been recognised as a potential advantage. Both rings suffer however from the disadvantage that when they are compressed between converging bodies bearing against opposite axial extremities, distortion of the body of the ring is necessary accompanied by a progressive if slight change in the area of contact between each extremity and its respective body or by some rolling and/or skidding action between them. The friction effects resulting from such rolling and/or skidding have been found to lead to some inaccuracy and inconsistency in the signals produced by such rings. Alternatively, non-uniformity of properties leads to non-uniformity of distortion and, again, to inconsistency in the signals.

The present invention is a ring of different shape, designed with the object of diminishing the inaccuracies just referred to, but sharing with the second of those rings the advantage of presenting a clearly defined region where hoop stress is set up when the ring is subjected to an axial load. The invention is a ring-shaped load-measuring device in which the opposite axial extremities of a ring-shaped element are similar to radius and geometry and are adapted to resist distortion when the element is subjected to compression or tension in an axial direction, and in which the part of the element lying between the axial extremities is of generally sinuous shape when viewed in radial section, this sinuous shape having equal radii adjacent to the two extremities and a limiting—that is to say maximum or minimum=- radius at an axially-intermediate point, and in which strain gauges responsive to changes in hoop stress are mounted around the element at the limiting radius.

The sinuous shape be such that the limiting radius is the maximum radius of the element.

The axial extremities of the element may be accurately flat and parallel in radial planes lying normal to the axis of the device, to bear against other converging flat parallel faces when the element is put under an axial load. Those other faces may be provided by a cylindrical casing for the element, comprising a side wall and opposite end walls. There may be a facility for relative axial movement between the side wall and at least one of the end walls of such a casing, so that the casing yields readily in response to an applied axial load, whereby substantially the entire load is transmitted to the element and distorts it.

The axial extremities of the element may be internally threaded to receive threaded members, for instance rods or tubes, extending away from the element in opposite axial directions: the element can then be put under axial load by hauling those members apart or urging them together axially. If a casing with annular end walls is present, by internally threading it so that it engages with the same members they can serve also to locate element and casing concentrically.

Where the member is of tube-like or other hollow shape, the complete device may thus have a continuous axial hole through it.

Primary strain gauges to measure hoop strain are preferably located at equal intervals of arc around the circumference of the element at the limiting radius. An array of secondary strain gauges, the output of which may be used to compensate for secondary distortions of the element other than those which are caused by applied load and which the device is intended to measure, can be located around the circumference of the element in a pattern similar to that of the primary gauges, but at circumferentially-intermediate locations. The secondary gauges may respond to distortion of the surface of the element in directions generally parallel to its axis.

A ring-shaped stiffening sleeve, in coaxial engagement with the element, may modify the distortion of the element and thus the response of the strain gauges and so, in appropriate cases, improve the linearity of the correlation between applied load and response. The sleeve and element may be threaded together, or there may be an interference fit between them. The sleeve may be of varying thickness along its axial length, being of relatively large thickness at both of its opposite axial ends but thinner at mid-length.

The invention will now be described by way of example, with reference to the accompanying drawings, in which.

Figure 1:
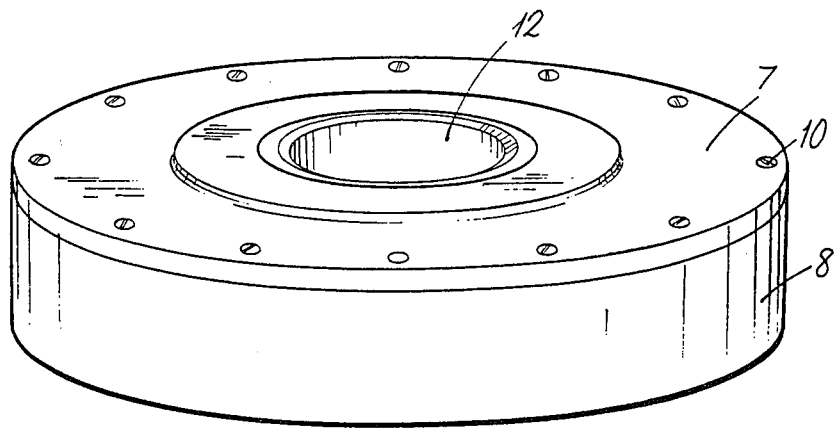
FIG. 1 is a perspective view of one ring-shaped element, within its casing.
Figure 2:
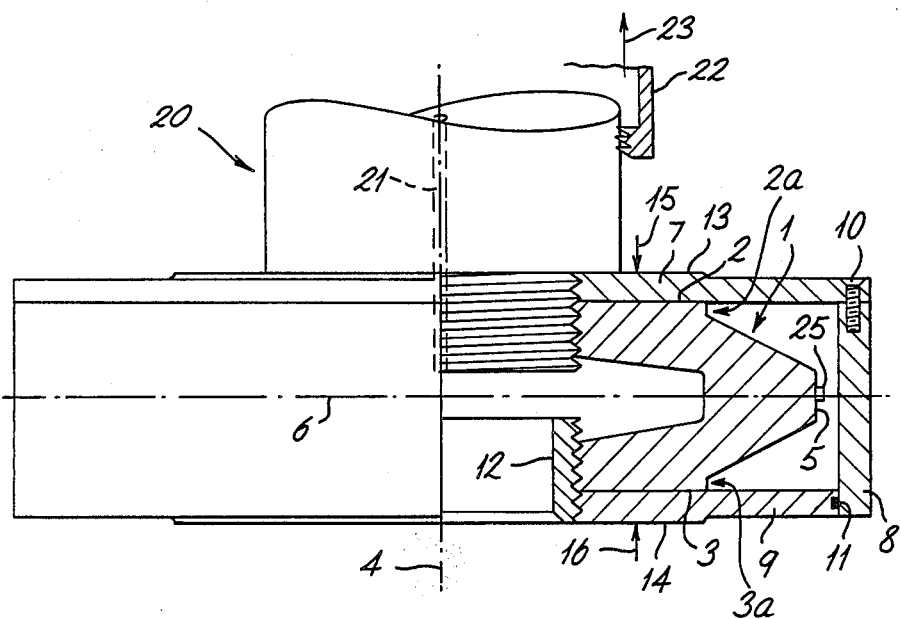
FIG. 2 is partly a diametral section through what is shown in FIG. 1, and also includes part-views of a modification.
Figure 3:
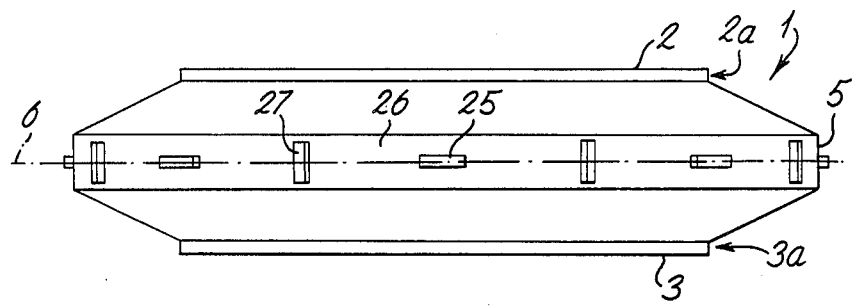
FIG. 3 is an external view of the element of FIG. 1 alone, in elevation.

The ring-shaped element 1 of FIGS. 1 to 3 presents opposite axial end faces 2 and 3 which are accurately flat and parallel to each other and lie at right angles to the ring axis 4. The regions of the element adjacent to the end faces 2 and 3 are of robust section and are of similar configuration. Between the axially-innermost extremities 2a and 3a of those regions lie a part of the element whose shape, as seen in section in FIG. 2, is sinuous: that is to say it changes progressively from minimum radius at 2a to a limiting (as illustrated, maximum) radius over an axial length 5 located at midheight relative to axis 4, and then returns to minimum radius at 3a. The shape of the element is symmetrical about the mid-height radial plane 6. The element is housed within a casing comprising an annular top plate 7, a cylindrical side wall 8 an annular bottom plate 9. Plate 7 is secured to side wall 8 by studs 10, but wall 8 and plate 9 are separated by a flexible "O"-ring seal 11 which permits relative axial movement but excludes the external environment. The internal diameters of plates 7 and 9 and of element 1 are threaded. As shown in FIG. 1 and in the lower half of FIG. 2, they can receive an externally-threaded tube 12 which locates element 1 accurately within its casing and also leaves a central hole, convenient if the device is being used to measure axial loads in connection with some process such as the drawing of tube or rod in which the workpiece can pass coaxially through the central hole. A compressive load will typically be applied to the device by sandwiching it between opposed and converging platens which bear against surfaces 13 and 14 of plates 7 and 9 as indicated by arrows 15 and 16. Because of the freedom of relative movement which the seal 11 gives to plate 9 and side wall 8, substantially the full compressive load is transmitted through plates 7 and 9 to the element 1 itself and distorts that element in a manner to be described.

In place of the tube 12 an externally threaded rod 20, solid except for a small central ventilation hole 21, may be used to ensure concentricity between element 1 and its casing. When the element is to be used to measure a tensile load it will typically be in threaded engagement with two such rods, one at each axial end, the load being applied to the rods by some convenient means—such as jaws 22—acting upon each rod as indicated by arrow 23.

Because end faces 2 and 3 are of equal size and in axial alignment with each other, and because of the stabilizing contact with tubes 12 and rods 20 and the robust construction of the end regions of the element, the effect upon the element of compressive or tensile axial loads applied as just described is such that faces 2 and 3 remain parallel to each other. There is thus no tendency for relative rolling or skidding between those faces and the plates 7 and 9. Stress and consequent strain of the element is concentrated therefore in the mid-height area of limiting radius. To respond to that strain, producing an output from which the applied compressive or tensile axial load may be derived, eight resistance-type electrical strain gauges 25 are mounted around the surface 26 of axial length 5, at equal angular intervals and aligned circumferentially so as to respond to strain in the hoop direction. Eight similar gauges 27, also equally spaced, are mounted on the surface 26 but lie parallel to the axis 4 and are located in the spaces between gauges 25. A compensation factor is derived from the output of gauges 27 and applied to the output of gauges 25, to compensate for whatever proportion of the total output of gauges 25 is representative of distortions due to factors other than the axial load which is to be measured—for instance, temperature changes. The manner in which outputs are derived from gauges 25 and 27, and then combined and used to produce an indication of the applied load, is well known in the art: an example is described in the specification of U.K. Patent GB No. 2036344B.

Figure 4:
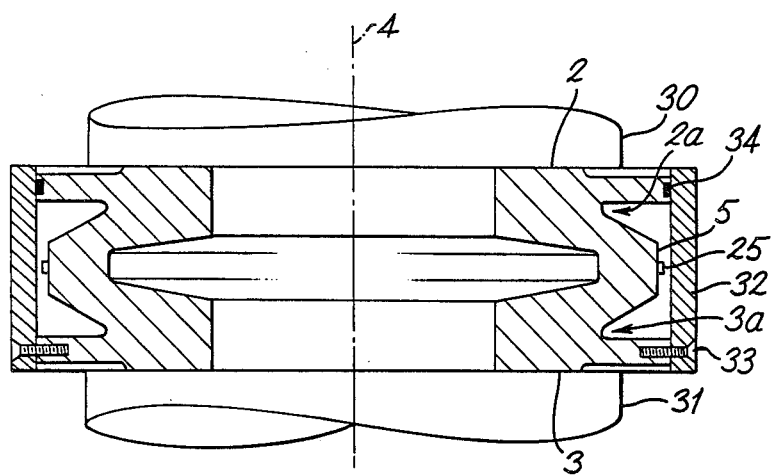
FIG. 4 is a diametral section through another device.

FIG. 4 shows an alternative element, of more angular section, in outline. Here the opposed platens by which a compressive load will be applied are indicated to 30 and 31, and bear directly against the opposed end faces 2 and 3 of the element because there are no equivalents of the end plates 7 and 9 but only a cylindrical wall 32, secured to the outer edge of the element adjacent its lower end by studs 33, but separated from it adjacent the upper end by an "O"-ring 34 permitting relative axial movement between the element and the protective wall.

Figure 5:
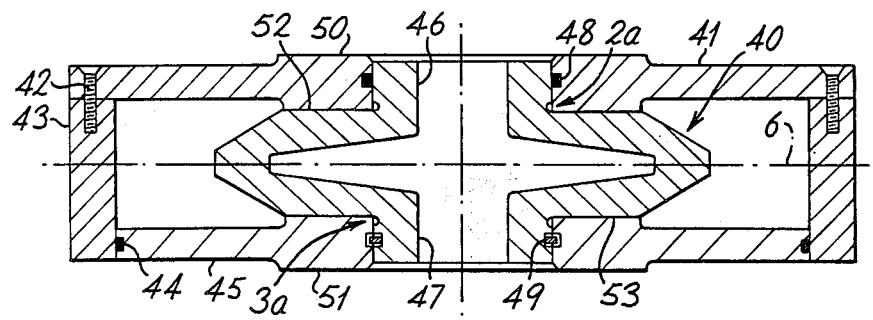
FIG. 5 shows another device in diametral section.

The device of FIG. 5 is similar to that of FIG. 2 in that it comprises a ring-shaped element 40 within a casing comprising a top plate 41 secured by studs 42 to a cylindrical side wall 43, and an "O"-ring seal 44 is interposed between the side wall and a bottom plate 45. In this design however the element 40 presents an integral top collar 46 and bottom collar 47, the casing is held concentric relative to element 40 by top plate 41 fitting around the collar 46 with an "O"-ring seal 48 intervening, and by bottom plate 45 fitting around bottom collar 47 with a loose-fitting circlip 49 in between. Because casing plates 41 and 45 are deeper than the collars 46 and 47 which they surround, converging axial loads do not bear upon the collars but only on the axial extremities 50, 51 of the top and bottom plates, and through them directly onto the top and bottom surfaces 52, 53 of the element itself.

Naturally the output of gauges 25 will require different processing to give an appropriate output, according to whether the element is to be put into axial compression or tension. It should be noted that the invention is not limited to ring-shaped elements as shown, in which the mid-height limiting radius is a maximum; an alternative element of re-entrant section in which the limiting radius is a minimum, rather than a maximum, is also possible.

Figure 6:
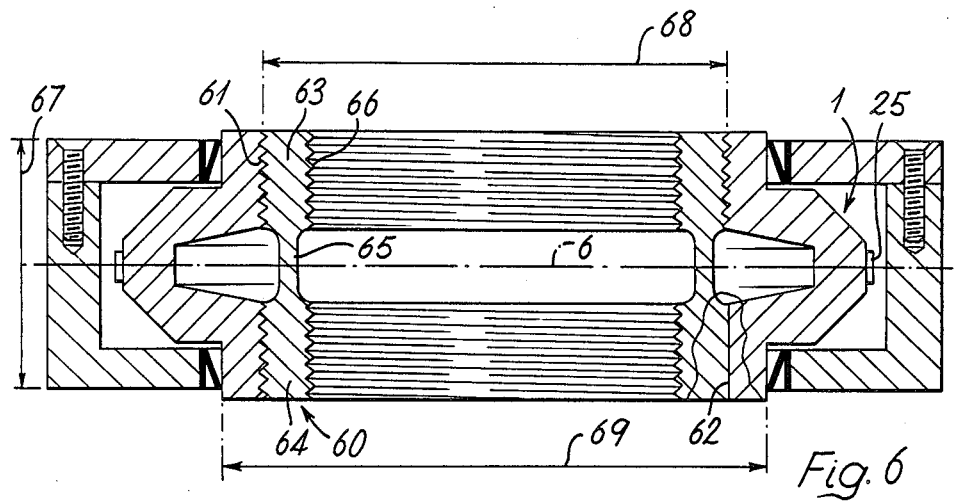
FIG. 6 is a diametral section through a modified device with certain parts shown in simplified form only.

The distortion of the element 1 as shown in FIG. 6, and the response of the gauges 25, is modified by a sleeve 60 which is located coaxially relative to the element 1, threaded engagement being made at 61 between an external thread formed on the sleeve and a matching internal thread formed on the element. Alternatively, as shown by way of example at the bottom right-hand corner of the engagement, the sleeve and the element may make an interference fit 62, for instance by being force-fitted or shrink-fitted together. At its axially opposite end portions 63 and 64, where it engages directly with element 1, the sleeve 60 is of equal and relatively-great thickness measured along its radius. Between those two end portions, however, is a thinner portion 65. The sleeve 60 may also be internally threaded, as at 66, for instance to engage with externally threaded rods 20 as shown in FIG. 2. In combination with the gauges 25, element 1 as shown in FIG. 6 will also of course typically carry a similar array of compensation gauges 27 as shown in FIG. 3.

Figure 7:
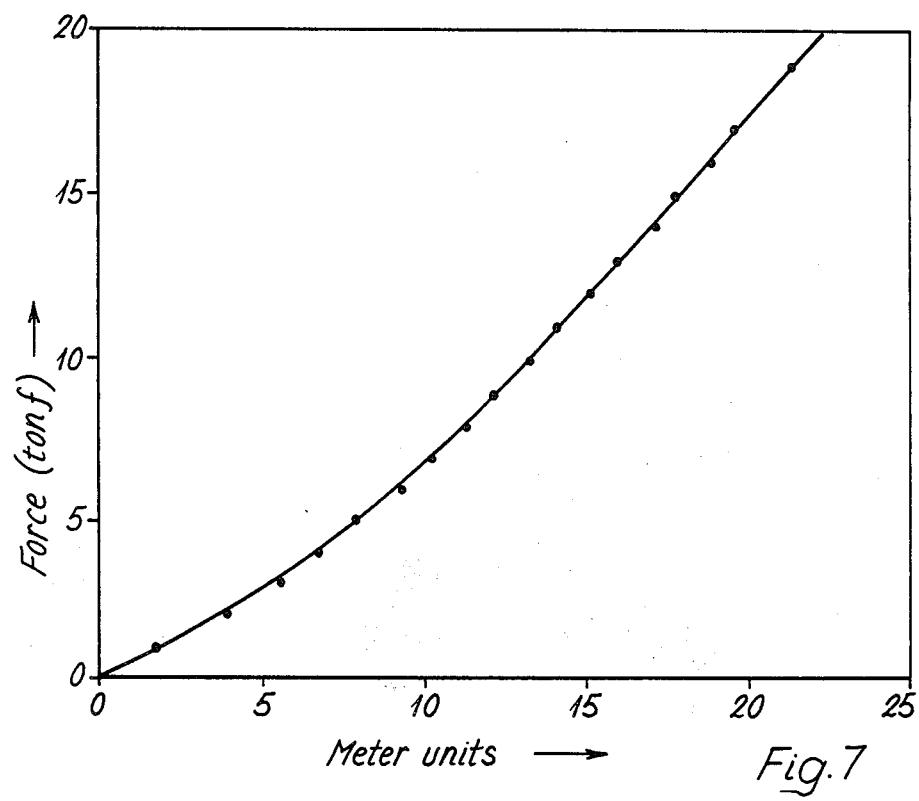
FIG. 7 is a graph illustrating the performance of a device as shown in FIG. 6.

Tests indicate that the linearising effect of the sleeve 60 upon distortion of element 1 and response of gauges 25 depends primarily upon the necked-down centre portion 65. FIG. 7 illustrates the linearity of the relationship between meter units (i.e. the effect of output gauges 25) and the compressive force (in tons) to which a device as shown in FIG. 6 was subjected. The readings of FIG. 7 apply to a device designed to withstand a compressive force of 20 tons, and in which dimensions 67, 68 and 69 as indicated in FIG. 6 were respectively 1.31 inches, 2.28 inches and 2.75 inches.

What is claimed is:

1. A ring-shaped load-measuring device comprising:
   a ring-shaped element, presenting first and second opposite axial extremities;
   an intermediate part of said element lying between said opposite axial extremities, said part being of sinuous shape when viewed in radial section;
   said part having equal outer radii adjacent said first and second axial extremities of said element and a limiting outer radius at a point axially-intermediate said extremities, said limiting radius being a maximum or minimum radius of said part,
   primary strain gauges responsive to changes in hoop stress mounted around the circumference of said part of said element at said limiting radius, and
   a ring-shaped stiffening sleeve in coaxial engagement with said element,
   said sleeve being adapted to modify load induced distortion of said element and thus said response of said primary strain gauges.

2. A device according to claim 1 in which said limiting outer radius of said intermediate part is the maximum radius of said part, and in which the minimum outer radius of said intermediate part occurs adjacent to said first and second axial extremities of said element.

3. A device according to claim 1 in which said first and second axial extremities of said element respectively present first and second axial end faces, each of said end faces being accurately flat and parallel and lying in a radial plane relative to said device.

4. A device according to claim 3, in combination with a casing in which said device is contained, said casing comprising a cylindrical side wall and first and second opposite end walls, and in which the connection between said cylindrical side wall and at least one of said end walls permits relative axial movement of said connected walls.

5. A device according to claim 1 in which said first and second axial extremities of said ring-shaped element are internally threaded whereby to engage with complimentarily-threaded components.

6. A device according to claim 1 in which said primary strain gauges are located at equal intervals of arc around said circumference of said intermediate part of said element at said limiting radius.

7. A device according to claim 6 including an array of secondary strain gauges, the output of said secondary strain gauges being adapted to compensate for secondary distortions of said ring-shaped element other than those which are caused by applied load and which said device is intended to measure, said secondary strain gauges being located around said circumference of said intermediate part of said element at said limiting radius in a pattern similar to that of said primary gauges, but at circumferentially-intermediate locations.

8. A device according to claim 1 in which said engagement between said sleeve and said element is a threaded engagement.

9. A device according to claim 1 in which the engagement between said sleeve and said element is an interference-fit engagement.

10. A device according to claim 1 in which the material of said sleeve is of varying radial thickness along the axial length of said sleeve, being of relatively large axial thickness at each of its opposite axial ends but thinner mid-way between said ends.

11. A device according to claim 1 wherein said opposite axial extremities are similar in radius and geometry and resist distortion when said element is subjected to compression or tension in an axial direction.

* * * * *